Patented June 26, 1923.

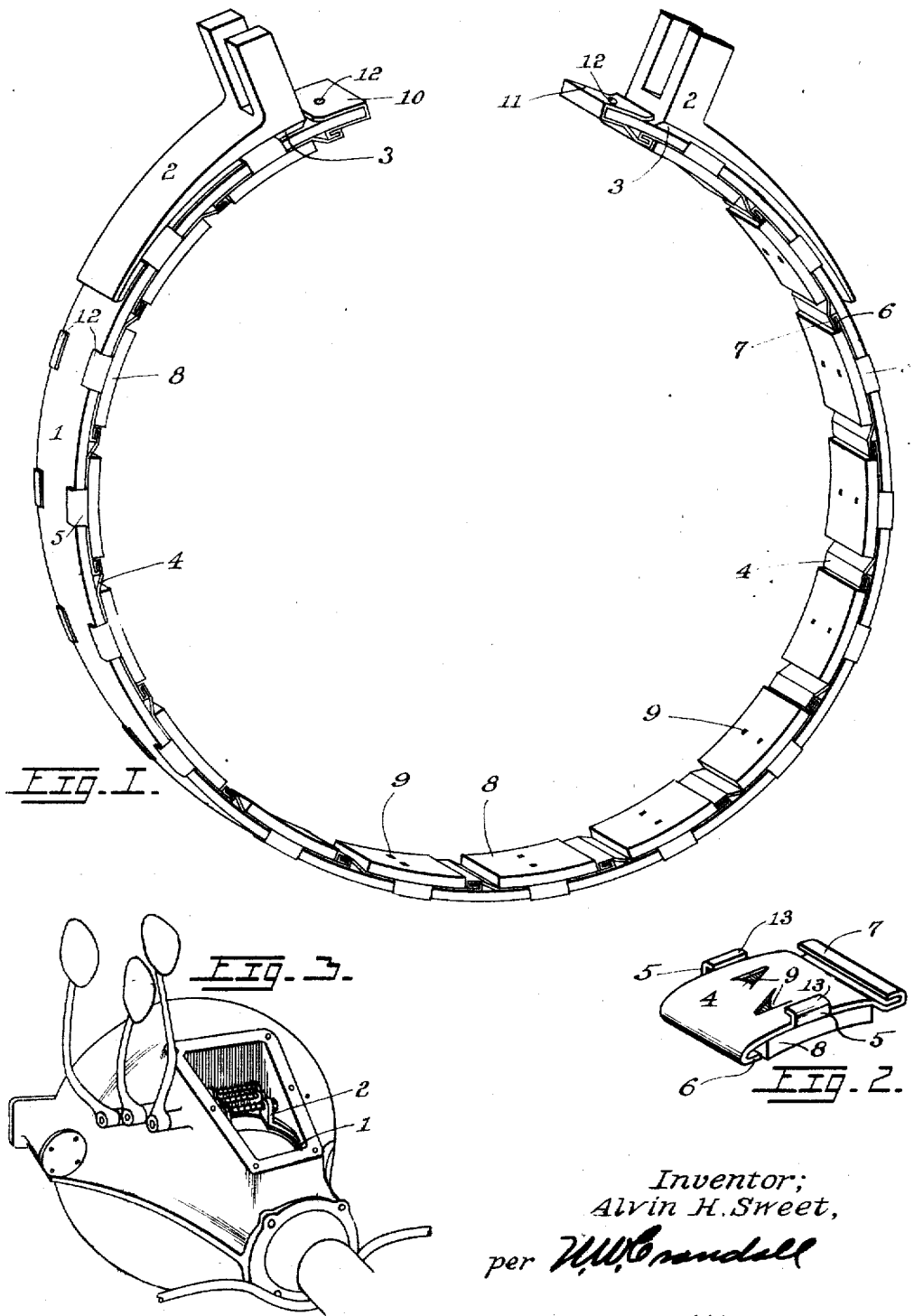

1,460,118

UNITED STATES PATENT OFFICE.

ALVIN H. SWEET, OF LOS ANGELES, CALIFORNIA, ASSIGNOR OF ONE-THIRD TO CHARLES A. SWEET AND ONE-THIRD TO CHARLES R. TWITCHELL, BOTH OF LOS ANGELES, CALIFORNIA.

LINKED BRAKE-BAND LINING.

Application filed July 27, 1922. Serial No. 577,935.

To all whom it may concern:

Be it known that I, ALVIN H. SWEET, a citizen of the United States, residing at Los Angeles, in the county of Los Angeles and State of California, have invented a new and useful Linked Brake-Band Lining, of which the following is a specification.

My invention relates to improvements in brake band linings and particularly when they are housed or relatively inaccessible for relining. The objects of my improvement are, first, to provide a sectional lining that may be removed from or applied to a brake band without disassembling or removing it from its normal position; and, second, to afford facilities for renewing only a portion of the lining and for rearranging certain portions according to their relative condition of wear.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the device illustrated in the accompanying drawing, in which—

Figure 1 is a perspective view of a brake band fitted with my improved lining. Figure 2 is a perspective view of one of the sections of the lining, on an enlarged scale; and Figure 3 is a perspective view of a common form of transmission gearing employing brake bands, and showing the relative inaccessibility of these for renewing the linings in the ordinary manner.

Similar numerals refer to similar parts throughout the several views.

The brake band 1, when used in connection with my invention, may be of any usual and suitable form except that, where the width of the end clips 2 is the same or nearly equal to the width of the band, the inner edges of the clips should be chamfered as shown at 3. This is to expose the edges of the band near the ends to afford facilities for engagement by the lugs of the lining sections.

The lining comprises a plurality of interlocking sections formed substantially as shown in Fig. 2. The body part 4 of these sections is preferably made of sheet steel. The lugs 5 at the backs of these are for engaging the edge of the brake band, and the turned over ends 6 and 7 are adapted for flexibly engaging the adjacent sections of the lining. Friction material 8 is attached to the body of the sections by means of clinch points pressed inwardly from the material of the back, as indicated at 9, and clinched in the friction material as indicated in Fig. 1.

At the two ends of the series of lining sections are the terminal clips 10 and 11 as seen in Fig. 1. These are without side lugs and each is bent backwardly over its respective end of the brake band. These clips are held in position by means of holes 12 engaging pins (not shown) slightly projecting from the surface of the brake band.

Flanges 13 on lugs 5 are often superfluous and may be omitted. In that case the lugs 5 merely extend straight out from the back and serve only to keep the sections in place so far as axial movement is concerned.

The lining is built up by adding a section at a time and slipping it around the band circumferentially as it is completed. Conversely one of the end clips 10 or 11 is first removed when it is desired to change the lining, and the latter is then slipped around circumferentially. When the section to be removed is free of the brake band it is disengaged from the adjacent sections by sliding it in an axial direction. It is obvious that worn sections can be replaced in this manner, and that partially worn sections can be transferred to other positions on the band where the wear is relatively less. It will also be evident that the lining is flexible and otherwise perfectly adapted for braking purposes.

I claim:

1. A brake lining comprising a plurality of flexibly hooked sections, adapted for mutual disengagement by transverse sliding.

2. A brake lining comprising a plurality of flexibly hooked sections, adapted for mutual disengagement by transverse sliding and means for engaging the edges of a brake band for alignment therewith.

3. In combination, a brake band; a lining comprising a plurality of flexibly hooked sections adapted for mutual disengagement by transverse sliding; and means for removably attaching said sections to said band.

4. In combination, a brake band; a lining comprising a plurality of flexibly connected sections, said sections being adapted for mutual disengagement by transverse sliding and for engaging the edges of a brake band for alignment therewith; and end clips adapted for transverse sliding engagement with said sections and for engaging the ends of said band for maintaining angular relation therewith.

5. In combination, a brake band; a lining comprising a plurality of flexibly connected sections, said sections being adapted for mutual disengagement by transverse sliding; end clips adapted for transverse sliding engagement with said sections; means for aligning said sections within said band; and means for removably attaching said clips to said band.

ALVIN H. SWEET.